United States Patent

Stanley

[15] 3,642,236
[45] Feb. 15, 1972

[54] G-FIELD PARACHUTE RECOVERY APPARATUS AND METHOD

[72] Inventor: Robert M. Stanley, Denver, Colo.
[73] Assignee: Stanley Aviation Corporation, Aurora, Colo.
[22] Filed: May 8, 1970
[21] Appl. No.: 35,792

[52] U.S. Cl. .....................244/138, 244/147, 244/122 AD
[51] Int. Cl. ...........................................................B64d 25/08
[58] Field of Search ............244/138, 122, 122.11, 122.12, 244/122.13, 122.14, 122.15, 122.19, 141, 147, 148, 149

[56] References Cited

UNITED STATES PATENTS

| 3,186,662 | 6/1965 | Martin | 244/122 AD |
| 3,311,330 | 3/1967 | Hofferberth et al. | 244/141 |
| 3,436,037 | 4/1969 | Stanley | 244/122 |

*Primary Examiner*—Trygve M. Blix
*Assistant Examiner*—Carl A. Rutledge
*Attorney*—Strauch, Nolan, Neale, Nies & Kurz

[57] ABSTRACT

An apparatus and method for recovering a man or other load from an aircraft or other vehicle and comprising a rocket for accelerating the man away from the vehicle and a letdown parachute having a canopy stowed in a deployment bag and connected to the man by shroud and riser lines. The deployment bag is stowed in a parachute pack cover, and the parachute shroud lines emerging from the deployment bag are also stored in the pack outside of the deployment bag. The parachute pack is opened by a delay means while the rocket is accelerating the man away from the vehicle to dump the deployment bag behind the man. By being dumped into the acceleration field resulting from the ignited rocket flight away from the vehicle, the canopy-containing deployment bag remains relatively motionless as the rocket moves the man away, thereby deploying the parachute shroud and riser lines. As the shroud lines approach full-line stretch the bottom or skirt end of the deployment bag is opened to release the canopy, and upon reaching full-line stretch the shroud lines are pulled taut with a strong jerk causing the released canopy to leap forward, thereby engulfing a large bubble of air. Canopy inflation is completed by the continued motion of the man. The rocket is connected to the man by a towline so that ignited flight of the rocket pulls the man away from the vehicle while his parachute streams out behind him.

22 Claims, 19 Drawing Figures

PATENTED FEB 15 1972

INVENTOR
ROBERT M. STANLEY

BY *Strauch, Nolan, Neale, Nies & Kurz*
ATTORNEYS

PATENTED FEB 15 1972 3,642,236

INVENTOR
ROBERT M. STANLEY

BY Strauch, Nolan, Neale, Nies & Kurz
ATTORNEYS

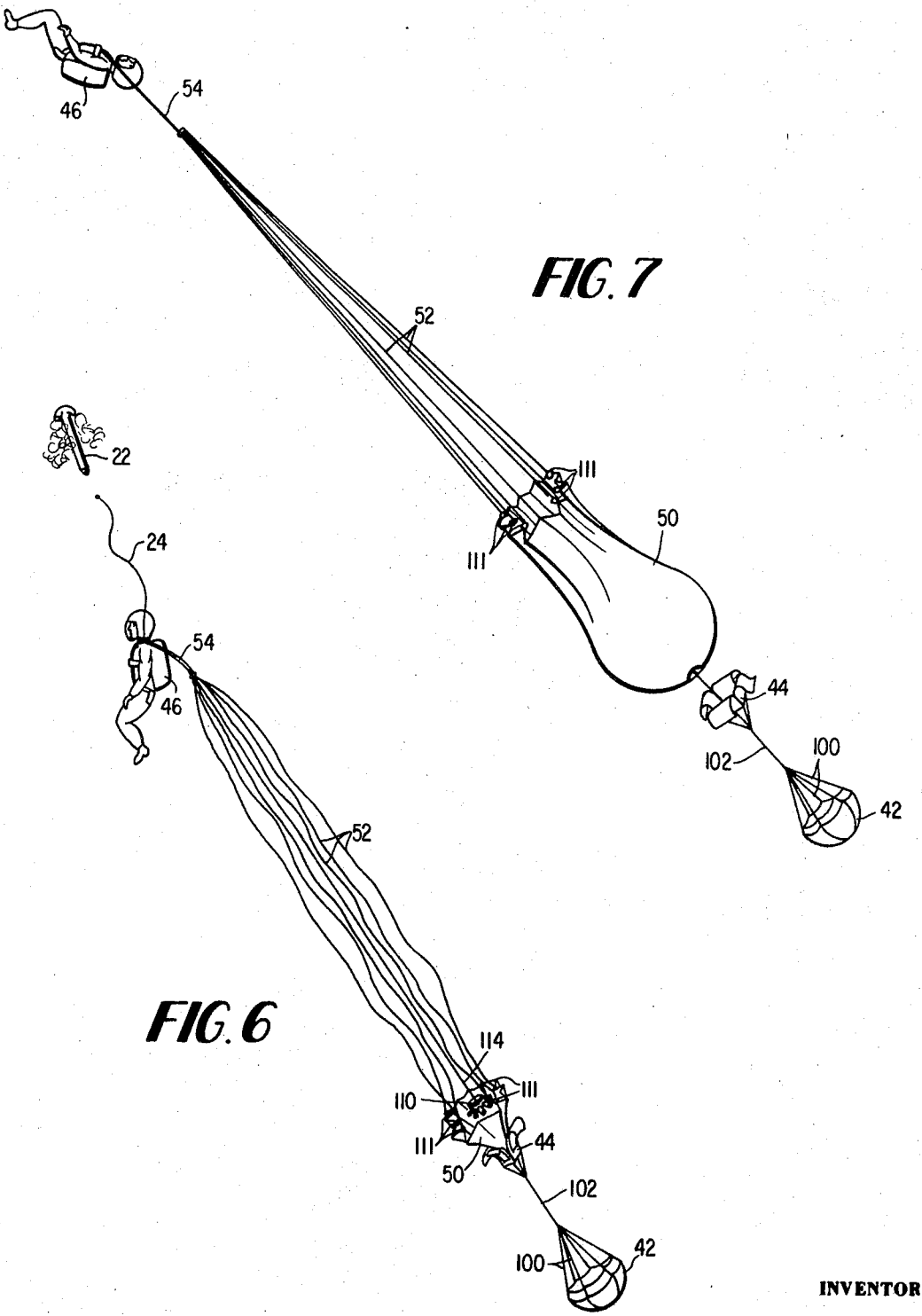

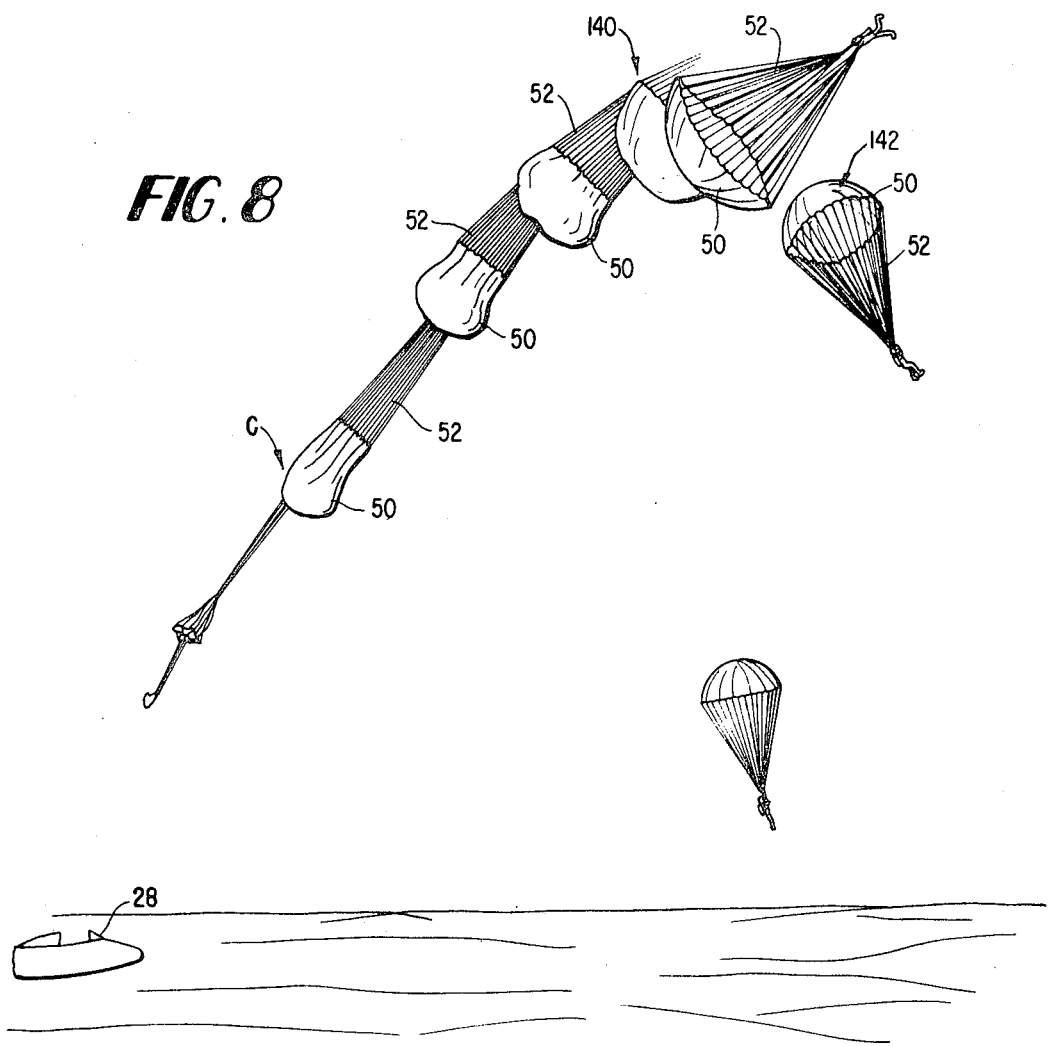

INVENTOR
ROBERT M. STANLEY

INVENTOR
ROBERT M. STANLEY

BY *Strauch, Nolan, Neale, Nies & Kurz*
ATTORNEYS

G-FIELD PARACHUTE RECOVERY APPARATUS AND METHOD

FIELD OF INVENTION

This invention relates to escape systems for effecting the safe recovery of a person or other load from an aircraft or other vehicle.

BACKGROUND

In making a parachuted recovery, the two most important factors for an escape system are the time and distance required to achieve effective retardation of the man's motion by an open parachute, and the shorter these are, the better.

In conventional escape systems using ejection seats, the trajectory of the ejection seat is spectacularly high, with parachute deployment sometimes waiting until the ejection seat apogee is reached. While this conventional mode of escape and parachuted recovery is satisfactory for straight and level flight, it is unacceptable and dangerous for the man escaping under adverse, low altitude and high sink rate conditions. In such all-too-common conditions at high sink rate and unpredictable attitude, the man's only hope is to get his parachute open just as soon as he possibly can.

Traditionally, a parachute is deployed by the pull of a rip cord which permits its pack cover to open. A spring-loaded pilot chute then jumps out of the open pack and catches the airstream, pulling the main parachute canopy by its apex. Only after the parachute has been pulled a distance about equal to the length of the shroud lines and risers attached to the man does it begin significantly to inflate. Thus, the inflation of a conventional parachute is delayed until its pilot parachute has traveled a distance equal to the sum of the lengths of the parachute risers, shroud lines, half the parachute diameter, the length of the pilot parachute, and the lanyard connecting the pilot parachute to the main parachute canopy. Even then, parachute inflation is inhibited by the pull of the pilot parachute on the canopy of the main parachute, tending to keep the canopy squidded against the catenary forces of inflation.

SUMMARY AND OBJECTS OF INVENTION

In accordance with this invention, the let-down parachute canopy is stowed in a special deployment bag, and the deployment bag is stowed in the parachute pack cover, with the parachute shroud lines being stored in the cover beneath the deployment bag. The parachute pack cover is opened in an acceleration field while a rocket or other powered means is pulling the man away from the aircraft. Upon release from the man, the canopy-containing deployment bag remains relatively motionless as the shroud lines extend to line stretch, which is about half the distance required for inflating a conventional parachute. As the shroud lines approach full-line stretch, the deployment bag opens to release the parachute canopy. When the parachute shroud lines reach full-line stretch, they are pulled taut with a strong jerk, causing the released parachute canopy to leap forward and engulf a large bubble of air, even before the canopy has appreciably unfolded. Continued motion of the man completes the inflation of the canopy. The pull of the rocket or other power means carrying the man away from the aircraft assures that there is always a relative wind forcing the parachute to inflate. Moreover, with the recovery apparatus of this invention, the parachute can start inflating while the rocket is still burning, thereby avoiding the loss of precious time and altitude.

Deployment of a parachute canopy below or behind a conventional ejection seat, while the ejection seat rocket is still burning, usually is extremely hazardous, unless by some coincidence, the seat-man center-of-gravity should fall precisely coincident with the rocket thrust vector. The reasons for this are twofold. First, the ejection seat will tumble and wrap the parachute around itself. Even more likely, the parachute would be destroyed by the rocket flame. For these reasons, efforts are made in conventional ejection seat recovery systems to prevent the parachute from being deployed until after the ejection seat rocket has burned out. As a result, valuable time and distance are lost.

To avoid the foregoing objectionable conditions, this invention incorporates an escape system having an extraction or tractor rocket which is used advantageously to pull the man away from the aircraft. This type of escape system is disclosed in U.S. Pat. No. 3,424,409 issued to R. M. Stanley on Jan. 28, 1969, for "Occupant Escape Apparatus for an Aircraft or the Like."

In the escape system disclosed in U.S. Pat. No. 3,424,409, the extraction rocket is connected to the man by a towline. The extraction rocket is launched in an unignited condition from the aircraft, and when the towline is pulled taut, the rocket propellant is ignited, thus causing the rocket to extract, rather than eject the man from the aircraft. The extraction rocket automatically aligns its thrust vector with the man's center of gravity to thus eliminate rocket-induced tumbling. The man's seat normally remains in the aircraft to thus avoid seat/man collision hazards. Moreover, the rocket and its fire stay well above the man. As a result, the parachute apparatus of this invention can be opened without danger while the rocket is still burning. Moreover, the parachute of this invention can be deployed in a critical low-speed range as the man separates from the seat without danger of burning or entanglement.

With the foregoing in mind, a major object of this invention resides in the provision of a novel method and apparatus for quickly deploying and inflating a letdown parachute.

A more specific object of this invention is to provide a novel method and apparatus whereby a letdown parachute is deployed while the man's escape rocket is still burning and connected to the man.

Still another specific object of this invention is to provide a novel method and apparatus wherein a letdown parachute is deployed in the acceleration field that is produced by the escape rocket which forcibly removes the man from the vehicle.

Other objects of this invention will appear as the description proceeds in connection with the appended claims and the below-described drawings.

DESCRIPTION OF DRAWINGS

FIG. 6 illustrates the deployment of the crewman's letdown parachute following the condition illustrated in position B of FIG. 5;

FIG. 7 illustrates the inflation of the crewman's letdown parachute canopy following the deployment shown in FIG. 6;

FIG. 8 is a composite showing the different stages of deployment and opening of the crewman's letdown parachute;

DETAILED DESCRIPTION

Figure 1:
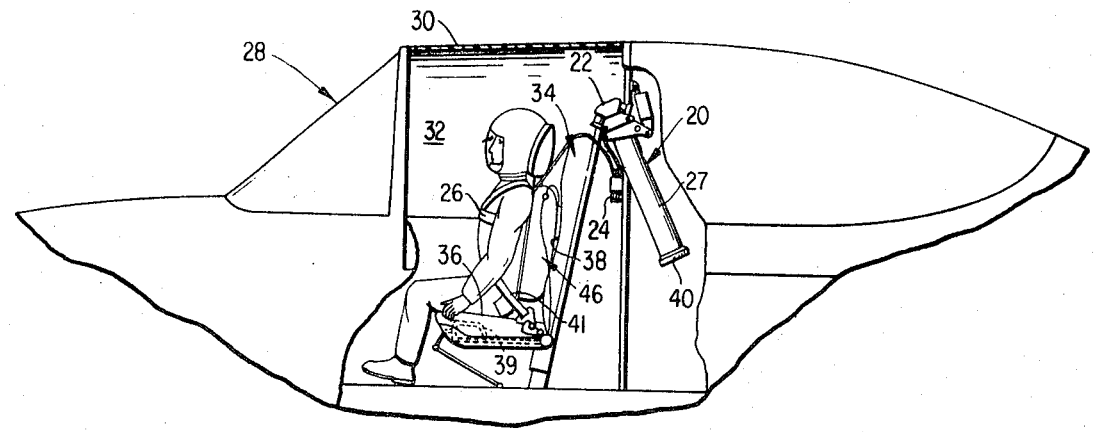
FIG. 1 is a fragmentary side elevation of an aircraft containing a preferred embodiment of this invention and having the fuselage partially broken away to show interior details.

Referring now to the drawings and more particularly to FIG. 1, the apparatus for forcibly removing an occupant or other load from an aircraft or other vehicle is generally indicated at 20 and is preferably the same as that described in the previously mentioned U.S. Pat. No. 3,424,409 issued to R. M. Stanley on Jan. 28, 1969. U.S. Pat. No. 3,424,409 is hereby incorporated into this specification by reference.

Briefly, apparatus 20 comprises a tractor type rocket 22 which is connected by a motion-transmitting, extendible, flexible pendant or towline 24 to a suitable harness 26 that is worn by the man. Prior to use, rocket 22 is mounted in a rocket launching tube 27 which is supported in the vehicle carrying the man. The vehicle may be, by way of example, an aircraft indicated at 28 and having a conventional jettisonable canopy 30 for enclosing a cockpit 32. Mounted in cockpit 32 is a suitable seat assembly 34 that is adapted to accommodate a pilot or other occupant. Seat assembly 34 comprises a seat pan 36 and a seat back 38 extending upwardly from pan 36. In aircraft where the hatch or other escape opening provides little room for clearance of the man's legs, the seat assembly is advantageously of the type shown in FIG. 26 of U.S. Pat. No. 3,424,409. With this type of seat the force exerted by the flight of rocket 22 pulls back 38 upwardly a short distance, allowing pan 36 to pivot down so that the seat assembly extends to form a chute (see FIG. 4) that guides the man out of the aircraft. It will be appreciated that this type of folding seat may be dispensed with where there is adequate room for clearance of the man's legs as he leaves the aircraft.

Figure 2:
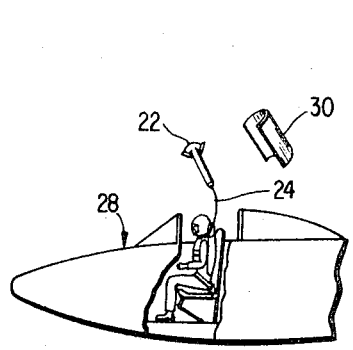
FIGS. 2, 3 and 4 are similar to FIG. 1 and illustrate the preferred sequence of steps for launching and igniting the rocket of the crewman's rocket-powered escape apparatus.
Figure 3:
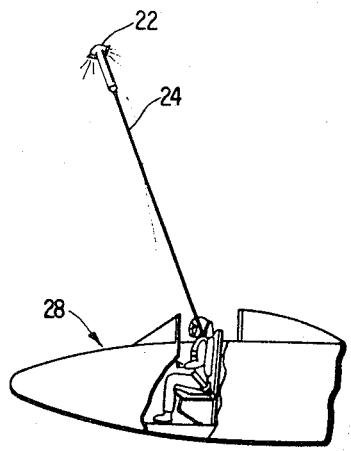

To initiate an escape with the apparatus thus far described, the pilot selectively pulls a D-handle 39 (FIG. 1) to release his lap belt, to actuate a conventional, unshown canopy jettison release mechanism and, to fire an unshown explosive charge in a rocket launching mechanism 40. Actuation of the canopy jettison release mechanism, jettisons canopy 30 in the usual manner, and firing of the rocket launching mechanism explosive launches rocket 22 in an unignited condition through the aircraft hatch opening as best shown in FIG. 2. Jettisoning of canopy 30 and launching of rocket 22 may be simultaneous.

By launching rocket 22, towline 24 is payed out or extended and when the towline is pulled taut, the rocket propellant is automatically ignited for continuing the flight of rocket 22 away from the aircraft pulls or extracts the man from cockpit 32 through the motion-transmitting connection provided by the tensioned towline. Thus, as rocket 22 travels away from the aircraft, the man is pulled clear of the aircraft as shown in FIG. 5 and trails remotely behind the aft or rearward end of rocket 22.

After a predetermined period of ignited rocket flight, means are automatically operated just prior to depletion of the rocket propellant to sever or otherwise disconnect the towline from the man to thereby free the extracted man from rocket 22 as best shown in FIG. 6. Rocket 22 under its remaining power then moves to a safe distance away from the extracted man to avoid injury to the man or damage to his parachute equipment.

Figure 4:
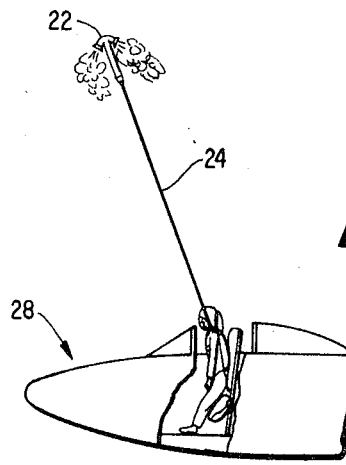
Figure 5:
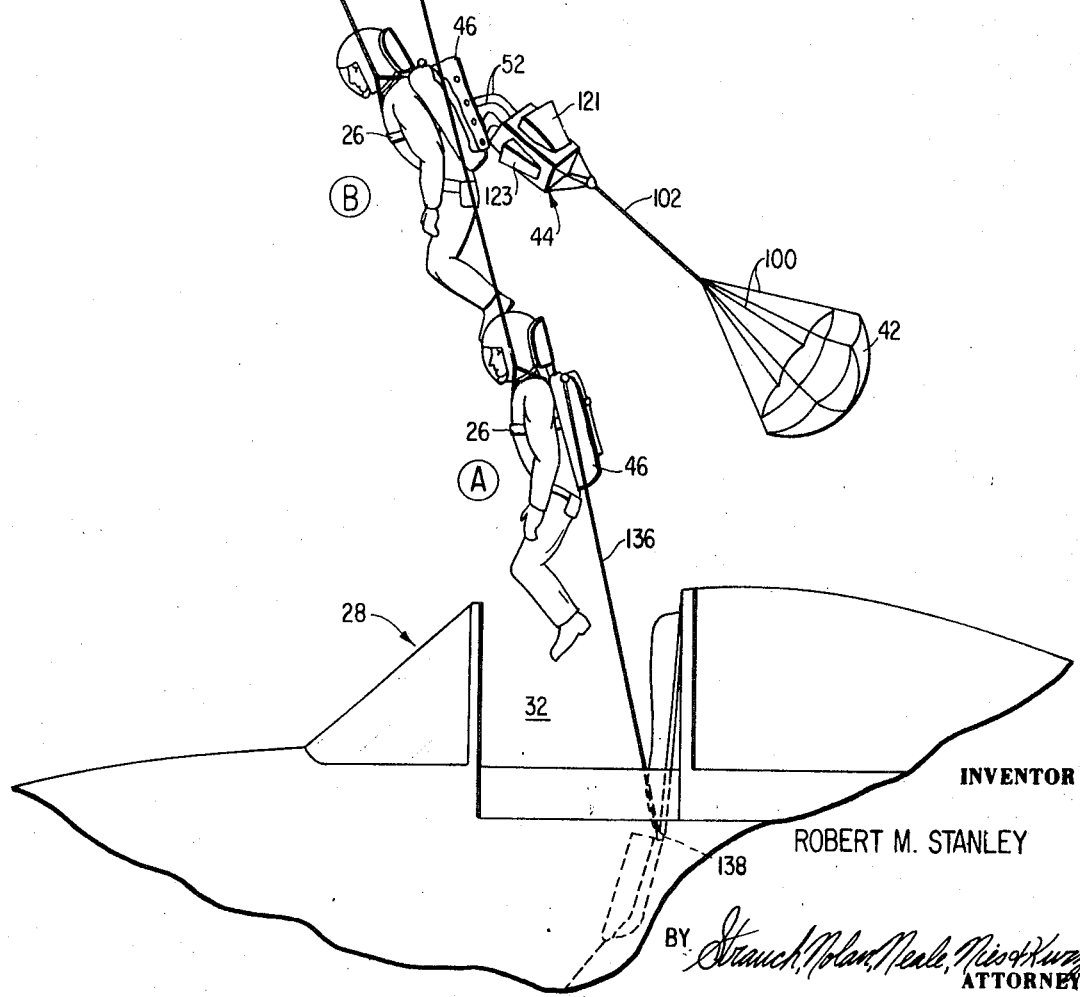
FIG. 5, which is also similar to FIG. 1, shows two steps A and B in the escape and parachute deployment sequence following the sequence shown in FIG. 4.
Figure 9:
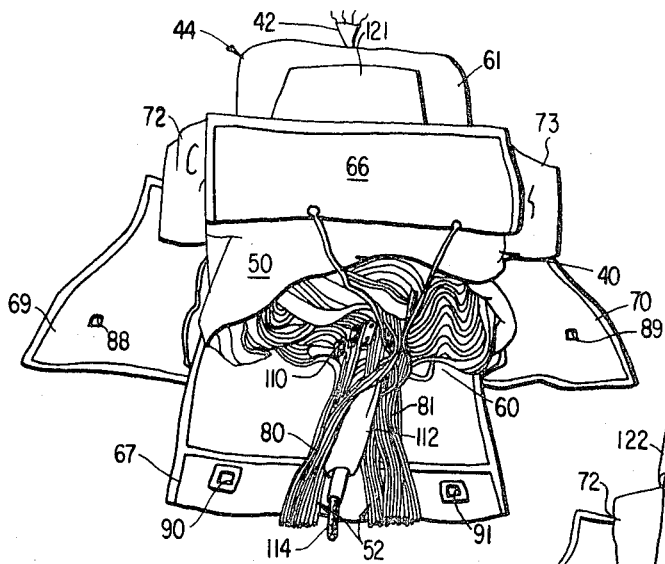
FIG. 9 is a perspective view of the parachute canopy deployment bag with the front, back and side closure flaps being folded back to illustrate the folded parachute canopy and bundled shroud lines.

In this embodiment, the crewman's lap belt 41 (FIG. 1) is automatically released so that the man separates from seat assembly 34 as best shown in FIGS. 4 and 5. Seat assembly 34 remains in the aircraft. The nozzles of rocket 22 are located at the forward end of the rocket.

As shown in FIGS. 5 and 9-11, the back-type parachute assembly of this invention comprises a main or letdown parachute 40, a pilot parachute 42, a parachute canopy deployment bag 44, and a parachute pack cover or outer container 46. The letdown parachute 40 is of conventional form and comprises a canopy 50 and a series of shroud lines 52 connecting canopy 50 to riser lines or straps 54 (See FIG. 7). Riser lines 54 are secured to harness 26 which is worn by the man. Parachute canopy 50 is packed in deployment bag 44.

Figure 10:
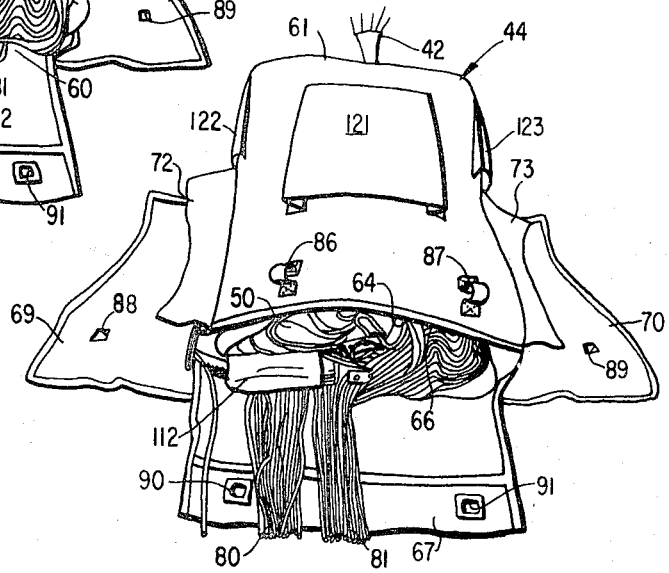
FIG. 10 is a perspective view similar to FIG. 9 and shows the packed deployment bag with the backflap folded down.

Bag 44, as shown in FIGS. 9-12, is fabricated from a suitable cloth and is formed with front and back walls 60 and 61 which are sewn together only along their side and top edges to form a container having an open bottom mouth indicated at 64 in FIG. 10.

Walls 61 and 60 respectively terminate at mouth 64 in end closure flaps 66 and 67. In addition, wall 60 has a pair of side or laterally extending closure flaps 69 and 70 adjacent to the lower, open end of the bag. The side edges of walls 60 and 61 are sewn together only up to the region where flap 66 begins. As shown, flap 67, when extended, is longer than flap 66 so that it can fold over flap 66 to close the open end of bag 44 in a manner to be described in detail later on. A pair of side flaps 72 and 73 are sewn to the opposite side edges of flap 66 as best shown in FIG. 10.

Figure 17:
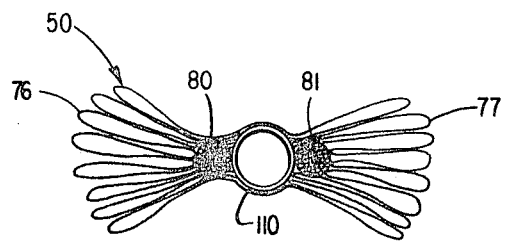
FIG. 17 is a transverse section of the letdown parachute looking toward the canopy apex and showing the bundled shroud lines and the canopy just prior to final folding and stowing in the deployment bag.

The gores of canopy 50 are divided evenly and folded in the manner shown in FIG. 17 to provide two groups of folded gores 76 and 77 that are arranged on opposite sides of a medial line passing through the canopy apex. The shroud lines for the gore group 76 are arranged in one bundle indicated at 80 in FIG. 17, and the shroud lines for the gore group 77 are arranged in a separate bundle that is indicated at 81 in FIG. 17. The folded groups of gores are then conventionally, transversely folded into double folds to the proper width needed for stowage in bag 44. Finally, the canopy is accordion folded in a suitable manner and is stowed in its folded condition in bag 44, with the canopy apex adjacent to the closed end of the bag and the canopy skirt adjacent to the open or flap end of the bag so that the shroud lines emerge from the open end as shown in FIG. 10. In the following description, the permanently closed end of the bag 44 will be referred to as the apex end, and the opposite, flap end of the bag will be referred to as the skirt end of the bag, since the canopy apex is at the permanently closed end while the canopy skirt is at the flap end of the bag.

Figure 11:
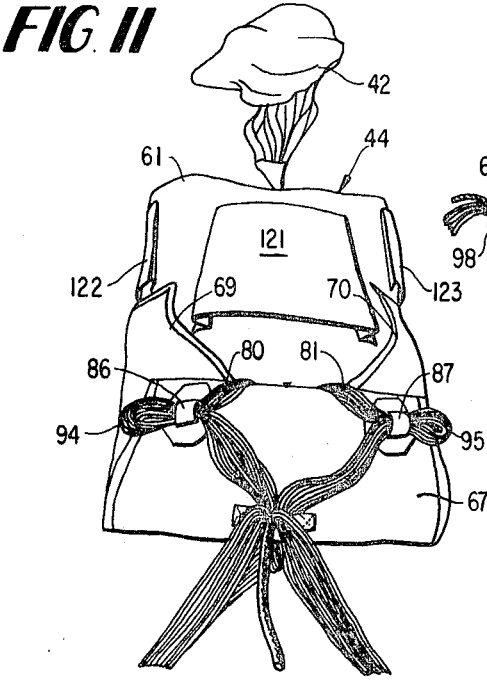
FIG. 11 is a perspective view similar to FIG. 10 and shows the front, back and side flaps folded over and releasably locked in place to close the packed deployment bag.
Figure 12:
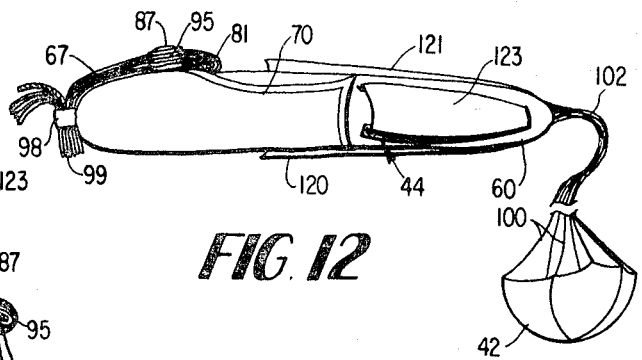
FIG. 12 is a side view in elevation of the packed deployment bag shown in FIG. 11.

After the canopy is folded and stowed in bag 44, flap 66 is folded down over the folded canopy skirt as shown in FIG. 10, and flaps 72 and 73 are folded down around the side portions of the canopy skirt. Flaps 69 and 70 are then folded over flap 66, and cloth retainer loops 86 and 87 (FIG. 10) are extended through reinforced apertures 88 and 89 (FIG. 10) respectively. Loops 86 and 87 are sewn on opposite corners of flap 66, and apertures 88 and 89 are respectively formed in flaps 69 and 70. Thereafter, the shroud line bundles 80 and 81, which at this stage are extending through the still open bottom of bag 44, are folded back to lie over flap 66. Flap 67 is then folded over flaps 66, 69 and 70 and portions of the shroud line bundles 80 and 81 so that bundles 80 and 81 emerge beyond flap 67 as shown in FIG. 11.

With flap 67 folded over flaps 66, 69 and 70 to close the open end of bag 44, loops 86 and 87 are pulled respectively through reinforced apertures 90 and 91 that are formed in the opposite corners of flap 67. The shroud line bundles 80 and 81 are then folded over the edge of flap 67 as shown in FIG. 11. The portion of bundle 80 extending beyond the edge of flap 67 and overlying flap 67 is folded to form a bight 94 which is pulled through loop 86 to releasably lock flap 69 and the left-hand corner of flap 67 to the left-hand corner of flap 66. Similarly, the portion of bundle 81 extending beyond the edge of flap 67 and overlying flap 67 is folded into a bight 95 which is pulled through loop 87 to releasably lock flap 70 and the right-hand corner of flap 67 to the right-hand corner of flap 66. The loops defining bights 94 and 95 face away from each other and toward the side edges of bag 44.

With bundles 80 and 81 looped through loops 66 and 67 in the foregoing manner, flaps 66, 67, 69 and 70 cannot be opened. As a result, the bottom of bag 44 cannot be opened to release the stowed canopy. As will be described in detail shortly, bights 94 and 95 of bundles 80 and 81 are pulled out of loops 86 and 87 by tensioning shroud lines 52. Thus, upon tensioning the shroud lines, flaps 66, 67, 69 and 70 are released to allow the bottom of bag 44 to open for releasing canopy 50.

Figure 13:
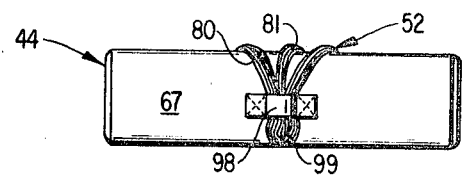
FIG. 13 is a bottom plan view of the packed deployment bag shown in FIG. 11.

As shown in FIG. 13, another cloth retainer loop 98 is centrally sewn to that portion of flap 67 which defines the bottom of bag 44 when flap 67 is folded over flaps 66, 69 and 70. The portions of bundles 80 and 81 extending beyond loops 86 and 87 are brought together, and the entire array of shroud lines 52 is folded to form another bight indicated at 99. Bight 99 is pulled through loop 98. Bight 99 must therefore be pulled out of loop 98 before tensioning of shroud lines 52 is effective to pull the bights 94 and 95 out of loops 86 and 87. Bight 99 is pulled out of loop 98 by tensioning that portion of the shroud line array which extends between bight 99 and riser lines 54.

Figure 14:
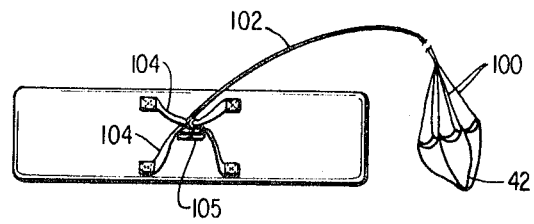
FIG. 14 is a top plan view of the packed deployment bag, illustrating the connection of the pilot parachute to the top of the deployment bag.

As shown in FIG. 14, pilot parachute 42 is of conventional form and has a series of pilot chute lines 100 that are secured to one end of a lanyard 102. A portion of lanyard 102 remote from lines 100 is knotted around a pair of cloth loops 104 that are centrally sewn to the closed or apex end of bag 44. The opposite end of lanyard 102 extends through a reinforced aperture 105 in bag 44 and is secured to the apex of canopy 50. Pilot parachute 42 is thus secured to loops 104 of bag 44 by one lanyard connection, and loops 104 are, in turn, secured to the apex of canopy 50 by another lanyard connection. It will be appreciated that two lanyards for making the two lanyard connections mentioned above may be used instead of the single lanyard indicated at 102.

A ballistic parachute canopy spreader gun 110 (see FIG. 9) may also be incorporated with the previously described letdown parachute, although the optimum recovery capability of the parachute apparatus of this invention effectively obviates the need for such spreaders. Spreader 110 may be of conventional construction such as that described in U.S. Pat. No. 3,463,037 issued to R. M. Stanley on Apr. 1, 1969 for "Apparatus for Deploying and Opening Parachutes." Such a spreader gun comprises a series of projectiles 111 (see FIG. 6) that are secured to the canopy skirt and are mounted on an undesignated spreader head. An unshown ballistic charge in the spreader head is adapted to be fired by a firing mechanism 112, and the projectiles are forcibly propelled away from the spreader head in obedience to the expanding gases that are developed by igniting the ballistic charge. As the projectiles are propelled away from the spreader head, they carry the canopy skirt along to forcibly spread the canopy.

In this embodiment, spreader 110 is stowed in the bottom or skirt end of bag 44 beneath canopy 50, and a firing lanyard 114 that is connected to firing mechanism 112 is threaded along with one of the shroud line bundles 80 and 81 for attachment to one of the riser lines. The length of lanyard 114 is such that when shroud lines 52 are almost fully stretched, lanyard 114 will be tensioned to actuate firing mechanism 112 for firing the unshown ballistic charge. At this stage, bag 44 will be opened and partially stripped off canopy 50 in a manner to be explained in detail later on.

As shown in FIGS. 9-13, four pockets 120, 121, 122, and 123 in the form of cloth panels or the like may respectively be sewn to the front, back and both side portions of bag 44 on the exterior thereof. Each of the pockets 120-123 is closed at its end adjacent to the closed or apex end of bag 44. The opposite end of each of the pockets 120-123 has an open mouth facing in the same direction that the bottom of bag 44 opens. The purpose of pockets 120-123 will be explained shortly.

Figure 15:
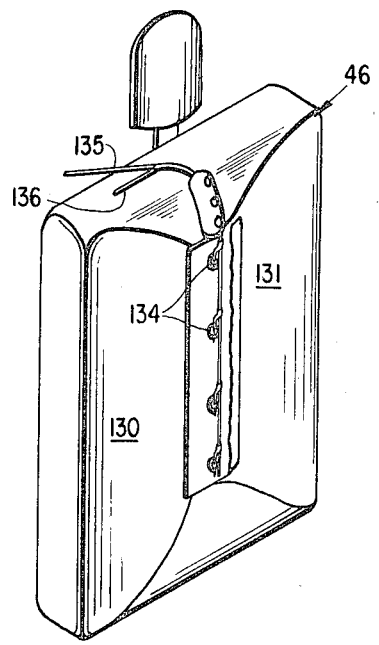
FIG. 15 is a perspective view of the parachute pack shown in FIG. 1.
Figure 16:
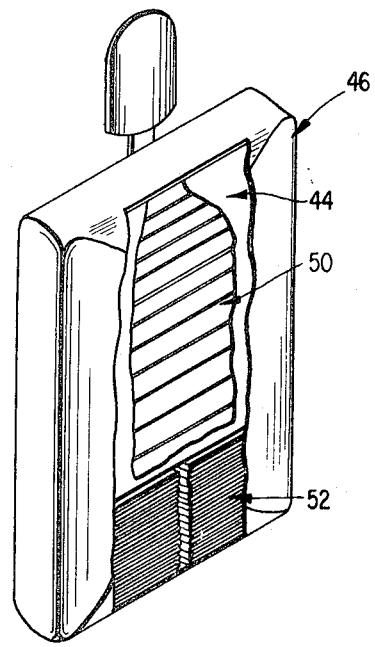
FIG. 16 is a similar perspective view of the parachute pack, but with the cover broken away to show interior details.

Referring to FIGS. 15 and 16, cover 46 may be of conventional form and is shown to be formed with two side flaps 130 and 131 defining the envelope containing the pack deployment bag 44 and shroud lines 52. Flaps 130 and 131 are releasably secured together by a row of conventional locking cones 134 secured to the marginal edge of one of the flaps 130 and 131. Cones 134 extend through reinforced holes in the overlapping side edge of the other of the flaps 130 and 131, and ripcord pins, which are secured to a ripcord 135, extend through cones 134 to releasably lock the flaps 130 and 131 together in the usual manner. Ripcord 135 is secured to one end of a lanyard 136, and the other end of lanyard 136 is normally secured to a part 138 of seat assembly 34 which remains in the aircraft.

Bag 44 containing the folded canopy 50 is stowed in the container envelope defined by cover 46, with the permanently closed or apex end of bag 44 being immediately adjacent to the upper end of the cover-defining envelope so that the flap or skirt end of bag 44 faces downwardly. Thus, canopy 50 is right-side-up, having its apex end disposed above its skirt end. Shroud lines 52, which emerge from the skirt or flap end of bag 44, are suitably folded and stowed in the envelope defined by cover 46 beneath bag 44. Alternatively, shroud lines 52 may conventionally be stowed in loops on the inner side of the front cover wall, and in this stowed position lines 52 will be in front of bag 44. In either case, shroud lines 52 are stowed exteriorly of bag 44 except for the small shroud line portions extending between the closure flaps at the skirt end of bag 44.

Pilot parachute 42 is folded in a conventional manner and is stowed in the envelope defined by cover 46 behind bag 44 and just under flaps 130 and 131. Pilot parachute 42 may be spring-loaded in a known manner so that when flaps 130 and 131 are opened by tensioning ripcord 135, the pilot parachute springs out of the pack behind the man. Flaps 130 and 131, when released, may be drawn back by conventional, unshown spring-opening elastic bands.

As previously explained, operation of the recovery system is initiated by pulling handle 39 to launch rocket 22 after canopy 30 has been jettisoned. When towline 24 is pulled taut the rocket propellant ignites to continue the rocket flight away from the aircraft. The ignited rocket separates the man from the seat 34 and pulls him out of cockpit 32 through the motion-transmitting connection provided by the tensioned towline. It will be appreciated that the rocket thrust accelerates the man away from his position in the aircraft.

At a point where the man just about clears the aircraft (see position A in FIG. 5), lanyard 136 is tensioned to tension ripcord 135. By tensioning ripcord 135 the ripcord pins are pulled from cones 134 to release flaps 130 and 131, thereby opening the parachute pack.

The length of lanyard 136 is determined by the minimum clearance needed to prevent the pilot parachute 42 or the letdown parachute 40 from becoming snagged on the aircraft when the parachutes are deployed or are in the process of deploying. For the general type of aircraft shown in the drawings, the lanyard 136 need only be about 6 feet long. Thus, as shown in position A of FIG. 5, lanyard 136 is tensioned at a point where the man's feet still have not cleared the aircraft. In effect, lanyard 136 provides a fixed clearance delay that is determined by the length of the lanyard and the time required for the flight of rocket 22 from its launching position to a position where lanyard 136 is tensioned. The time delay provided by lanyard 136 is thus predetermined.

By releasing flaps 130 and 131, the spring loading deploys pilot parachute 42 rearwardly, and deployment bag 44 rearwardly tumbles out after pilot parachute 42. As shown in position B of FIG. 5, pilot parachute 42 is not required to cause deployment bag 44 to tumble out of the parachute pack when the latter is opened. Bag 44 will tumble out of the opened pack since there is nothing holding the bag to the opened pack. Owing to the upward movement of the man, bag 44 will tumble in such a direction that its permanently closed, apex end will generally be facing rearwardly toward the deploying pilot parachute. Thus, the opposite, skirt end of bag 44, from which shroud lines 52 emerge, will be facing generally toward the man's back.

As shown in FIG. 5, the distance traveled by the man from position A where lanyard 136 is tensioned to open the parachute pack to position B where bag 44 has tumbled out of the opened pack and where pilot parachute is fully deployed and inflated is very small and is only about 2 to 4 feet. Under zero aircraft airspeed conditions, therefore, bag 44 is dumped out in what essentially amounts to zero wind velocity.

Owing to the fact that the pack cover 46 is opened in an acceleration field while rocket 22 is pulling the man away from the aircraft, the dumped deployment bag 44 will remain relatively motionless, thus allowing rocket 22 to pull the man away from the dumped deployment bag. This phenomenon occurs because at the moment bag 44 is dumped from the opened parachute pack, only shroud lines 52 connect the subassembly of bag 44 and canopy 50 to the mass being accelerated by the flight of rocket 22. At this stage, shroud lines 52 instead of being tensioned, are still slack with the result that they will not transmit the rocket thrust to move or accelerate bag 44. Thus, at this stage, the only effective forces applied to the dumped deployment bag will be attributable to wind and gravity. Since neither the rocket thrust nor the man's motion is being transmitted to the dumped deployment bag at this stage, the dumped deployment bag will not follow the man along his line of escape travel. Furthermore, the forces exerted by the opened pilot parachute, pockets 120–123 and gravity would effectively oppose any inertial movement of bag 44 in the direction that the man is traveling. Thus, considering all of the forces acting on bag 44 after it is dumped from the opened parachute pack, it is clear that between the time the deployment bag is released and the time that shroud lines 52 are pulled taut, bag 44 will not follow the man and will remain almost motionless.

By holding bag 44 relatively motionless after it is dumped and by continuing ignited rocket flight to accelerate the man away from the aircraft, the man is rapidly pulled away from bag 44 to quickly pay out or deploy shroud lines 52 as best shown in FIG. 6. As shroud lines 52 closely approach full line stretch (i.e., at least 95 percent of full line stretch), they are stretched out sufficiently to pull bights 94, 95 and 99 out of loops 86, 87 and 98. As a result, flaps 66, 67 and 70 are released to open the mouth of bag 44, and further short movement of the man extends shroud lines 52 to a point where they begin to pull canopy 50 out of bag 44. As will be explained in somewhat greater detail later on, neither pilot chute 42 nor pockets 120–123 are needed for effecting the removal of canopy 50 from bag 44 in this mode of operation. The inertia of bag 44 without pilot chute 42 or pockets 120–123 is more than adequate to enable canopy 50 to be pulled out of the bag.

Just after flaps 66, 67, 69 and 70 are released to open the skirt end of bag 44 and very shortly before shroud lines 52 reach full-line stretch, spreader gun 110 is fired as a result of tensioning lanyard 114. The skirt of canopy 50 will therefore be pulled out forcibly by the inertia of projectiles 111 which are propelled away from the spreader gun as shown in FIG. 6. At this point, inflation of canopy 50 has begun even though the canopy has not, at this time, unfolded to any appreciable extent. For as shown in FIG. 6, the gores of canopy 50 are still partially folded and the accordion-folded apex end of the canopy is still in the bag. At this stage, which is shown in FIG. 6, the unshown mechanism in rocket 22 severs towline 24 or otherwise disconnects the towline from the man. Reference is made to U.S. Pat. No. 3,424,409 for a complete disclosure of this mechanism.

Although the man is disconnected from rocket 22 he will, by the effect of inertia, continue to move in the direction in which he was being pulled by the rocket. Thus, travel of the man through a very short additional distance after he is disconnected from rocket 22 will pull the shroud and riser lines fully taut.

Upon reaching full line stretch, shroud lines 52 are pulled taut with a strong jerk owing to the significant velocity differential between the man and the still relatively motionless canopy. At this stage it will be appreciated that even though the man has started to decelerate as a result of having been disconnected from rocket 22, his velocity will still be quite appreciable and will be almost the same as the velocity which he had at the moment the rocket was disconnected.

As shroud lines 52 jerk taut, they cause canopy 50, even in the absence of spreader gun 110, to leap forward, thereby engulfing a large bubble of air (see FIG. 7) even before canopy 50 has fully unfolded. At this stage, canopy 50 has been pulled completely out of bag 44, and the continued upward movement of the man completes the inflation of the canopy even before he reaches his apogee which is indicated at 140 in FIG. 8.

The pull exerted by rocket 22 while it was connected to the man assures that there is always a relative wind, forcing the canopy to inflate. Moreover, it will be appreciated that canopy 50 starts to inflate while rocket 22 is burning. As a result, loss of precious time and altitude is avoided. Upon being disconnected from the man, rocket 22 has sufficient propellant remaining to rapidly fly a safe distance away from the man and his parachute.

From the foregoing description it will be appreciated that the thrust produced by rocket 22 pays out shroud lines 52 very quickly after bag 44 is released and in a greatly reduced time as compared with that required for deploying the parachute shroud lines in conventional recovery systems. Furthermore, the thrust produced by rocket 22 provides the velocity required to inflate canopy 50 quickly and rapidly. In addition, shroud lines 52 are extended to full-line stretch in about one-half the distance required for the conventional methods of deployment. At zero airspeed and zero altitude conditions as shown in FIG. 8, the recovery system of this invention will fully inflate canopy 50 in the surprisingly short time of about 1.3 seconds.

Spreader gun 110, if utilized, does not significantly improve the foregoing recovery time.

After the man is disconnected from rocket 11, his velocity rapidly decelerates by virtue of the drag applied by the already inflated canopy so that the apogee of his trajectory is reached as indicated at 140 in FIG. 8. As the man approaches the apogee he is still ahead of parachute 40, and as his upward velocity diminishes due to the drag applied by canopy 50, he swings gently but quickly down to come under parachute 40 as indicated at 142 in FIG. 8.

As shown in FIG. 8, canopy 50 will be fully inflated by the time the man reaches his apogee at 140. Furthermore, it will be observed that parachute 40 is fully deployed well prior to the man's apogee. The position shown in FIG. 7 is identified as position C in FIG. 8. At this position parachute 40 has already been fully deployed and has engulfed the previously mentioned large air bubble as a result of jerking canopy 50 forward when shroud lines 52 are pulled taut.

Since rocket 22 is always well ahead of the man, the fire from the rocket nozzles at the forward end of the rocket are sufficiently remote to avoid injury to the man and the parachute streaming out behind the man.

In addition to the previously described upward escape route the recovery system of this invention may be utilized with equal advantage for a downward or sideward escape route. The escape route may be in a sideward or lateral direction where the aircraft is banked at a 90° roll angle. The escape route may also be sideward as in the case of aircraft, such as helicopters, having a side escape opening. One example of such a lateral escape route through a side opening in the vehicle is described in U.S. Pat. No. 3,361,397 issued to G. A. Valentine on Jan. 2, 1968 for "Occupant Escape Apparatus for Aircraft and the Like."

If the aircraft is one that is capable of very high speeds, it will be appreciated that a suitable, conventional speed sensor may be utilized to permit the parachute pack to open only after there is a sufficient time delay to allow the man to decelerate from the extraction velocity to a safe parachute opening speed. Under such conditions the sensor will operate any suitable, known means for severing or disconnecting lanyard 136 to prevent cover 46 from opening at the position indicated at A in FIG. 5. In such a high speed escape mode, parachute 40 will be deployed and opened in a conventional manner, and to open the parachute pack to deploy and open the parachute, it is only necessary to pull or tension ripcord 135. When parachute 40 is deployed in this high speed escape mode, both pilot parachute 42 and pockets 120–123 apply retarding or drag forces for stripping bag 44 off canopy 50.

It will be noted that the main purpose of pilot parachute 42 is to provide a positive stripping action for separating bag 44 and canopy 50 under conditions where parachute 40 is deployed by the standard, known technique. At zero or relatively low speed condition (i.e., low speed mode) where the parachute pack is opened by tensioning lanyard 136 to deploy the parachute in the rocket-produced acceleration field, pilot parachute 42 is not necessary for pulling bag 44 away from canopy 50. Instead, the inertia of bag 44, after it is released, is sufficient for achieving the removal of canopy 50 from bag 44.

At the relatively high speed escape mode where parachute 40 is deployed in the conventional manner, pockets 120–123 fill with air when bag 44 is deployed to apply a further drag to bag 44, thereby assisting parachute 42 in stripping bag 44 of canopy 50. But like pilot parachute 42, pockets 120–123 are not essential for removing canopy 50 from bag 44 when parachute 40 is deployed at zero or relatively low speed conditions in the rocket-produced acceleration field by tensioning lanyard 136.

In the zero or relatively low speed escape mode where rocket 22 is effective to deploy parachute 40, the portion of lanyard 102 between loops 104 and the canopy apex is sufficiently long that it will not be tensioned until after canopy 50 is out of bag 44 and has inflated significantly. Therefore, even though the lanyard portion between loops 104 and pilot parachute 42 is initially tensioned, the pull applied by pilot parachute 42 will not initially be applied to canopy 50 to inhibit inflation of canopy 50.

Figure 18:
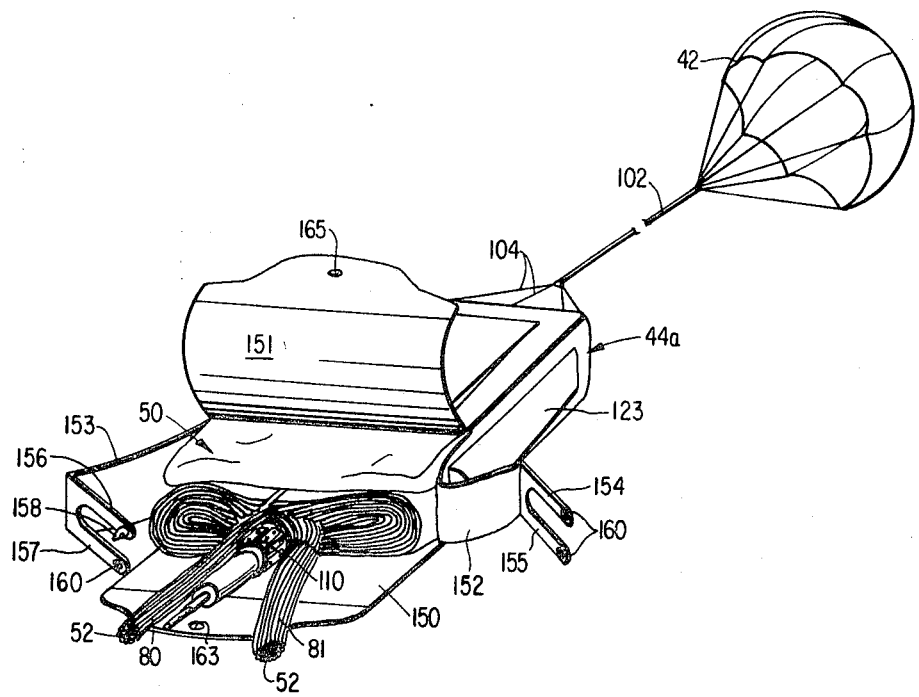
FIG. 18 is a perspective view of a modified form of deployment bag with the deployment bag closure flaps being folded to opened positions; and, FIG. 19 is a perspective view of the modified deployment bag shown in FIG. 18 and illustrating the closure flaps folded and locked in their closed positions.
Figure 19:
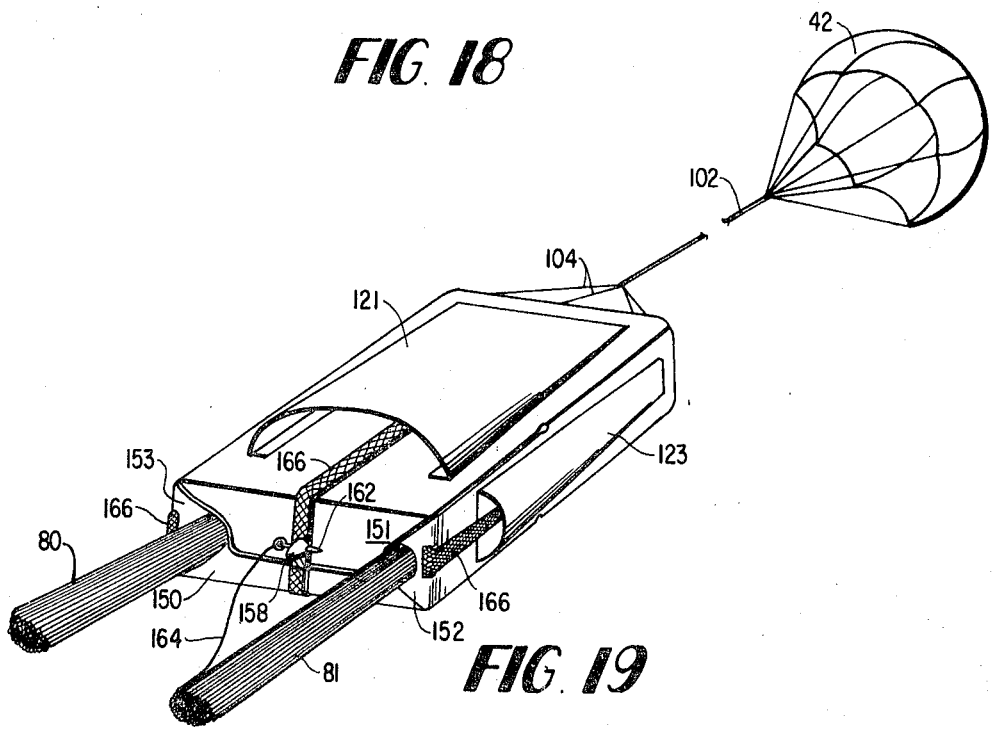

FIGS. 18 and 19 illustrate another cloth deployment bag 44a having a modified flap and locking construction. As shown, bag 44a has a pair of end flaps 150 and 151 and a pair of side flaps 152 and 153 for closing the shroud-line end of the bag. Flap 152 terminates in a pair of elongated arm portions 154 and 155, and flap 153 similarly terminates in a pair of elongated arm portions 156 and 157. The outer ends of the arm portions of each pair are free as shown, and flaps 152 and 153 are each joined to the body of bag 44a at a region about midway between the top and the bottom of the bag. A cone-type fastening element 158 is secured to the free end of arm portion 156, and the free ends of the remaining arm portions are provided with reinforced apertures indicated at 160. Other than the flap and locking construction, bag 44a is essentially the same as bag 44, like reference numerals being applied to designate like parts.

Canopy 50 is folded and stowed in bag 44a in the manner described in connection with bag 44. The shroud-line bundle 80 is then threaded between arm portions 156 and 157 of flap 153, and the free end of arm portion 157 is then folded over the free end of arm portion 156 to insert element 158 through the aperture 160 in arm portion 156. The shroud line bundle 81 is similarly threaded between arm portions 154 and 155, and the free ends of these arm portions are folded over each other, with fastening element 158 being inserted through the apertures 160 in arm portions 154 and 155. Flap 150 is then folded up over flaps 152 and 153, inserting element 158 through a reinforced hole 163 in flap 150. Then flaps 151 is folded down over flap 150, completing the closing of bag 44a. Element 158 is inserted through a reinforced aperture 165 in flap 151. A release pin 162 is then inserted into element 158 to releasably lock flaps 150–153 in their folded, closed positions as shown in FIG. 19. Pin 162 is connected by a lanyard 164 to one of the shroud lines 52. THe length of lanyard 164 is such that when shroud lines 52 closely approach full line stretch, lanyard 164 will be tensioned to pull pin 162 out of element 158. As a result, flaps 150–153 are released and are drawn back by elastic bands 166 to open the shroud line end of bag 44a. The point at which bag 44a is opened in the deployment sequence is the same as that described in connection with bag 44.

The invention may be embodied in other specific forms without departing from the spirit or essential characteristic. thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of removing a man or other load from a vehicle and of deploying a letdown parachute for recovering the man or other load upon removal from said vehicle, said method comprising the steps of applying an artificially created force to forcibly remove the man from the vehicle and to carry him through a air a predetermined distance away from the vehicle, and deploying said parachute into the airstream created by the man's movement through the air and substantially along the path of the man's movement through the air while said force is still being applied to said man.

2. The method defined in claim 1 wherein said parachute is deployed by releasing the folded canopy of said parachute from its pack while said force is being applied to the man, maintaining the canopy folded for a predetermined period after it is released, and maintaining the released, folded canopy relatively motionless at least in the man's line of travel while the continued movement of the man by said force displaces him away from the released canopy to pay out the shroud lines of said parachute.

3. The method defined in claim 1 wherein said force is applied to said man by providing for a rocket having an ignitable propellant and being positioned for flight away from said vehicle, by providing a motion transmitting towline connection between said rocket and said man or said other load for transmitting the thrust of the rocket to the man, and by igniting the rocket propellent to cause said rocket to fly away from said vehicle to pull the man or other load away from said vehicle.

4. The method defined in claim 3, wherein said force is applied to the man independently of said parachute.

5. The method defined in claim 3, wherein said force accelerates the man through a predetermined distance and wherein said parachute is deployed by releasing the canopy of the parachute from its pack while the man is being accelerated by said force to enable said force to move the man away from the released canopy for paying out the shroud lines of said parachute.

6. The method defined in claim 5, characterized in that said canopy is released just beyond that point where it could contact said vehicle.

7. The method defined in claim 5, wherein the canopy is folded in said pack, said method further comprising the steps of maintaining said canopy confined in a folded condition after it is released from said pack and for an appreciable predetermined percentage of shroud line stretch, and releasing said canopy from its confinement for deployment and inflation only when said shroud lines are deployed to said predetermined percentage of shroud line stretch.

8. A method of deploying and opening a letdown parachute having shroud and riser lines for connecting the canopy of the parachute to a man or other load, said canopy and shroud lines being folded in a parachute pack cover that is carried by the man and is adapted to be opened for releasing the parachute for deployment, said method comprising the steps of applying an artificially created force to said man to accelerate him through the air and away from a predetermined position, opening said cover to release the folded canopy into the man's airstream while said force is still being applied to said man, maintaining said canopy confined in its folded condition for a predetermined period after it is released, continuing to apply said force to the man after the folded canopy is released to continue the man's flight away from said parachute while holding the released, folded canopy relatively motionless to pay out said shroud lines substantially along the man's path of movement through the air, releasing the canopy from its confinement to enable it to unfold after said shroud lines are deployed by a predetermined magnitude, and finally inflating said canopy as it is unfolding.

9. The method defined in claim 8 wherein said canopy is inflated by jerking the shroud lines taut to cause the canopy to leap toward the man and engulf a large bubble of air.

10. A method of utilizing the thrust of a rocket powered escape system for deploying a letdown parachute wherein said rocket is operatively connected to a man or other load and is utilized to forcibly remove the man or other load from a vehicle and wherein said parachute has a canopy connected by shroud and riser lines to the man, with the canopy and the shroud lines being folded in a parachute pack cover that is adapted to be opened to release the parachute for deployment, said method comprising the steps of forcibly removing the man from said vehicle and moving him through the air by igniting the rocket propellent to cause the rocket to fly away from said vehicle, and opening said cover to release the folded canopy and shroud lines into the airstream created by the man's movement through the air while the rocket is still connected to the man and the rocket propellant is still burning to forcibly carry the man away from the released canopy and thereby stretch out said shroud and riser lines substantially along the path of the man's movement through the air.

11. A method of deploying and opening a letdown parachute having a canopy connected by shroud and riser lines to a man or other load to be recovered from a vehicle, said canopy and shroud lines being folded in a parachute pack cover that is carried by the man and is adapted to be opened to deploy the parachute, said method comprising the steps of launching a rocket from the vehicle and igniting the rocket propellant to produce a thrust for causing the rocket to fly away from the vehicle, applying the thrust of said rocket to the man independently of said parachute to forcibly pull the man from said vehicle and to carry him through the air a predetermined distance away from the vehicle, said cover to release the folded canopy and said shroud lines into the airstream created by the man 3 MOVEMENTS THROUGH THE AIR AFTER THE MAN IS REMOVED FROM THE VEHICLE AND WHILE SAID THRUST IS STILL BEING APPLIED TO THE MAN, MAINTAINING THE CANOPY CONFINED IN ITS FOLDED CONDITION FOR A PREDETERMINED PERIOD AFTER IT IS RELEASED, CONTINUING TO APPLY SAID THRUST TO THE MAN AFTER SAID CANOPY IS RELEASED TO PULL THE MAN AWAY FROM THE RELEASED, FOLDED CANOPY FOR STRETCHING OUT SAID SHROUD AND RISER LINES SUBSTANTIALLY ALONG THE PATH OF THE MAN'S movement through the air, releasing the canopy from its confinement to enable it to unfold, and finally inflating said canopy.

12. The combination defined in claim 11, wherein said escape apparatus further comprises as extensible towline for connecting said rocket to the man, said towline being extended to a tensioned condition by the flight of said rocket away from said vehicle, and said rocket applying a thrust through the motion transmitting connection provided by the tensioned towline to pull the man away from said vehicle, said towline being sufficiently long that the man trails remotely behind said rocket during its flight away from said vehicle, with said parachute being arranged to deploy behind the man.

13. In combination with an escape apparatus having a rocket adapted to operatively be secured to an occupant or other load in an air or space vehicle, and means for igniting the rocket propellant for causing said rocket to fly away from the vehicle to forcibly remove the occupant therefrom and to move him through the air, a parachute pack carried by the occupant and comprising a letdown parachute having a canopy and shroud and riser lines connecting said canopy to the occupant, and means responsive to a predetermined time delay for releasing said parachute into the airstream created by the occupant's movement through the air after the occupant is removed from the vehicle but while said rocket is secured to the occupant and the rocket propellant is still burning, there being sufficient rocket propellant remaining after said parachute is released and while said rocket is still connected to the occupant to forcibly move him a predetermined distance away from the released parachute to deploy said shroud and riser lines substantially along the path of the occupant's movements through the air.

14. The combination defined in claim 13, wherein said pack includes a parachute pack cover, said canopy and said shroud lines being folded and stowed in said cover, and said means responsive to said predetermined time delay comprising means for opening said cover to release the folded canopy and shroud lines into said airstream.

15. The combination defined in claim 14, wherein said assembly further comprises a normally closed deployment bag in which the folded canopy is stowed, said deployment bag being received in said cover, and said shroud lines being stowed in said cover exteriorly of said bag, said bag containing the folded canopy being dumped behind the occupant when said cover is opened, and means for opening said bag in response to a predetermined stretch of said shroud lines to provide for the removal of said canopy from said bag.

16. The combination defined in claim 14, wherein said means for opening said cover comprises releasable fastener means on said cover and a lanyard connecting said fastener means to said vehicle, said lanyard being tensioned by the removal of the occupant from said vehicle, and said fastener being operated by the tensioning of said lanyard to open said cover.

17. The combination defined in claim 16, wherein the effective length of said lanyard is sufficiently small that is is tensioned to open said canopy cover just when the occupant is clearing the vehicle.

18. In combination with an escape apparatus having a rocket adapted to operatively be secured by a motion transmitting towline to an occupant in an air or space vehicle, and means for igniting the propellant in said rocket for causing said rocket to fly away from said vehicle to forcibly remove the occupant therefrom and to pull the occupant through the air through the motion transmitting connection provided by said towline, a parachute pack comprising a parachute pack cover defining a normally closed envelope, a parachute canopy deployment bag stowed in said envelope, a letdown parachute having a canopy and shroud and riser lines connecting said canopy to the occupant, said canopy being stowed in said bag, and said shroud lines being stowed in said envelope exteriorly of said bag, means for opening said cover to release said bag and said shroud lines for deployment behind the occupant and into the airstream created by the occupant's movement through the air in response to a predetermined time delay after the thrust of the ignited rocket is first applied to the occupant to remove him from said vehicle and while the propellant-burning thrust of said rocket is being applied to occupant causing the occupant to be accelerated away from said vehicle, said bag with said canopy stowed therein having sufficient inertia that it remains relatively motionless at least in the direction of the occupant's travel to enable the propellant-burning thrust of said rocket to carry the occupant a predetermined distance away from the released bag and thereby stretch out said shroud lines, and means responsive to a predetermined stretch of said shroud lines for opening said bag to provide for the removal and inflation of said canopy.

14. A method of utilizing a force-producing system for deploying a man's letdown parachute to recover a man or other load wherein said force-producing system comprises a rocket having an ignitable propellant and positioned for flight away from the man, and an extendible, flexible towline providing a motion transmitting connection between said rocket and the man independently of said parachute, said method comprising the steps of igniting the rocket propellant to impart flight to the rocket and to pull the man through the air through the motion transmitting connection provided by said towline, and deploying said parachute into the airstream created by the man's movement through the air and substantially along the path of the man's movement through the air while said rocket is still connected to the man by said towline and while said propellant is still burning.

20. In combination with a rocket having an ignitable propellant and being positioned for flight away from a space, means for igniting the rocket propellant to cause the rocket to fly away from said space, and means providing a motion transmitting connection between said rocket and an occupant of said space for removing the occupant from said space and for rendering the occupant airborne by forcibly moving him through the air upon the ignited flight of said rocket away from said space, a parachute pack comprising a letdown parachute connected to the occupant, and means responsive to a predetermined time delay after the occupant is removed from said space for releasing said parachute into the airstream created by the occupant's movement through the air while said rocket is still connected by said motion transmitting connection to said occupant and while the rocket propellant is still burning, said rocket having sufficient propellant remaining after said parachute is released to forcible move said occupant away from the released parachute for deploying the shroud lines of said parachute substantially along the path of the occupant's movement through the air.

21. The combination defined in claim 20 wherein said means providing said motion transmitting connection comprises a flexible, extendible towline that is pulled taut by the flight of said rocket away from said space, said rocket upon flight away from said space being operative to pull the man away from said space through the connection provided by said towline.

22. The combination defined in claim 21, wherein said towline is connected to the occupant independently of said parachute and positions the occupant between said rocket and said parachute during deployment thereof.

* * * * *

UNITED STATES PATENT OFFICE
CERTIFICATE OF CORRECTION

Patent No. 3,642,236  Dated Feb. 15, 1972

Inventor(s) Robert M. Stanley

It is certified that error appears in the above-identified patent and that said Letters Patent are hereby corrected as shown below:

Column 8, line 40, change "11" to -- 22 --.

Column 10, Claim 1, line 23, change "a" first occurrance to -- the --.

Column 11, Claim 8, line 5, after "said" delete "parachute" and insert -- position --.

Column 11, Claim 11, line 46, after "the" change "man" to -- man's -- and delete "3" and change "movements" to -- movement --.

Column 11, Claim 11, line 44, after the comma insert -- opening --.

Column 11, line 58, Claim 12, change "as" to -- an --.

Column 12, line 32, Claim 16, after "fastener" insert -- means --.

Column 12, line 37, Claim 17, after "said" delete "canopy".

Column 12, line 70, Claim 19, change "14" to -- 19 --.

Column 11, line 57, change "11" to -- 13 --.

Column 14, line 5, change "forcible" to -- forcibly --.

Signed and sealed this 25th day of July 1972

(SEAL)
Attest:

EDWARD M. FLETCHER, JR.
Attesting Officer

ROBERT GOTTSCHALK
Commissioner of Patents